(12) United States Patent
Le Grand et al.

(10) Patent No.: US 9,357,520 B2
(45) Date of Patent: May 31, 2016

(54) METHODS AND SYSTEMS FOR SIGNAL DIFFUSION MODELING FOR A DISCRETIZED MAP OF SIGNAL STRENGTH

(71) Applicant: Google Inc., Mountain View, CA (US)

(72) Inventors: Etienne Le Grand, Mountain View, CA (US); Brian Patrick Williams, Mountain View, CA (US)

(73) Assignee: Google Inc., Mountain View, CA (US)

( * ) Notice: Subject to any disclaimer, the term of this patent is extended or adjusted under 35 U.S.C. 154(b) by 196 days.

(21) Appl. No.: 14/169,175

(22) Filed: Jan. 31, 2014

(65) Prior Publication Data

US 2015/0223189 A1    Aug. 6, 2015

(51) Int. Cl.
| | | |
|---|---|---|
| *H04W 24/00* | (2009.01) | |
| *H04W 64/00* | (2009.01) | |
| *H04W 92/10* | (2009.01) | |
| *H04W 4/06* | (2009.01) | |
| *H04W 84/12* | (2009.01) | |

(52) U.S. Cl.
CPC ............ *H04W 64/003* (2013.01); *H04W 92/10* (2013.01); *H04W 4/06* (2013.01); *H04W 84/12* (2013.01)

(58) Field of Classification Search
CPC ....... H04W 4/06; H04W 28/22; H04W 84/12; H04W 24/10; H04W 92/10; H04W 36/36; H04W 4/02; H04W 64/00; H04W 64/003; H04W 88/08; H04W 88/06; H04W 48/08; H04W 48/16; H04W 16/18; H04W 18/20; H04W 4/021; H04W 4/028; H04W 24/02; H04W 4/043; H04W 72/082; H04W 4/025; H04W 4/008; H04W 4/023; H04W 4/005; H04W 28/0215; H04W 28/0247; H04W 36/30; H04W 4/027; H04W 52/0229; H04W 88/04; H04N 21/6405; H04N 21/6408; G01S 13/765; G01S 7/40; H04H 20/71; H04J 3/0667; H04L 45/16; H04L 2001/0097; H04L 69/16; H04L 27/0008; H04L 2025/03414; H04L 5/0016; H04L 12/6418; H04L 2209/80; H04L 43/067; H04L 43/0811; H04L 43/0847; H04L 47/805; H04L 47/821; H04L 9/0872; H04B 1/406; H04B 7/0854; H04B 7/0617

See application file for complete search history.

(56) References Cited

U.S. PATENT DOCUMENTS

| | | | | |
|---|---|---|---|---|
| 2004/0127252 | A1* | 7/2004 | Tsunomoto | H04W 48/16 455/554.2 |
| 2006/0095349 | A1* | 5/2006 | Morgan | G01S 5/02 705/29 |
| 2011/0250926 | A1* | 10/2011 | Wietfeldt | H01Q 1/243 455/525 |
| 2013/0257657 | A1* | 10/2013 | Garin | G01C 21/206 342/451 |

FOREIGN PATENT DOCUMENTS

WO    WO 2012/106075    8/2012

OTHER PUBLICATIONS

Chen, et al., "Outlier-Detection-Based Indoor Localization System for Wireless Sensor Networks", http://www.hindawi.com/journals/ijno/20121961785 (2012).

* cited by examiner

*Primary Examiner* — Nimesh Patel (74) *Attorney, Agent, or Firm* — McDonnell Boehnen Hulbert & Berghoff LLP (57) ABSTRACT

Examples herein include methods and systems for signal diffusion modeling for a discretized map of signal. An example method includes receiving data related to RSSI for a wireless AP for a plurality of locations of an area, associating the data to a diagram of the area based on the plurality of locations of the area, determining a given partition of the diagram in which a magnitude of a given RSSI associated with the given partition is greater than or equal to a highest magnitude of a given RSSI associated with any partitions of the plurality of partitions, assigning a location of the wireless AP to be within the given partition, and applying a constraint such that a magnitude of a given RSSI associated with other respective partitions is less than or equal to a highest magnitude of a given RSSI associated with neighboring partitions of the other respective partitions.

19 Claims, 7 Drawing Sheets

| 3 | 2 | 6 | 7 | 4 | 4 |
|---|---|---|---|---|---|
| 3 | 4 | 2 | 10 B | 4 | 4 |
| 4 | 8 | 7 | 8 | 3 | 2 |
| 3 | 8 | 12 A | 5 | 3 | 2 |
| 3 | 8 | 7 | 8 | 3 | 2 |
| 4 | 3 | 2 | 3 | 4 | 4 |

NO REGULARIZATION
APPLIED:
MAP OVERFITS

FIG. 7D
SMOOTHING APPLIED

FIG. 7E
DIFFUSION CONSTRAINTS APPLIED

FIG. 7F

METHODS AND SYSTEMS FOR SIGNAL DIFFUSION MODELING FOR A DISCRETIZED MAP OF SIGNAL STRENGTH

BACKGROUND

Unless otherwise indicated herein, the materials described in this section are not prior art to the claims in this application and are not admitted to be prior art by inclusion in this section.

A location of a computing device can be determined using many different techniques including based either on Global Positioning System (GPS) data or on data associated with a wireless access point, such as a cellular base station or an 802.11 access point. For example, a mobile computing device may receive a GPS signal and responsively determine its position on the face of the Earth (e.g. an absolute location). In a different example, a mobile computing device may receive a signal from either a cellular base station or an 802.11 access point. The cellular base station or an 802.11 access point may estimate an exact location. Based on the location of either the cellular base station or an 802.11 access point, the mobile computing device can calculate its exact position.

Within some instances, a localization of a mobile computing device may occur via use of data from multiple different networks. Many location based services can be provided to a mobile computing device based on determining the location of the mobile computing device.

SUMMARY

In one example, a method is provided that comprises receiving data related to received signal strength indication (RSSI) for a wireless access point for a plurality of locations of an area, and associating the data to a diagram of the area based on the plurality of locations of the area. The diagram is divided into a plurality of partitions. The method also includes determining, by a processor, a given partition of the plurality of partitions of the diagram in which a magnitude of a given RSSI associated with the given partition is greater than or equal to a highest magnitude of a given RSSI associated with any partitions of the plurality of partitions, assigning a location of the wireless access point to be within the given partition, and applying, by the processor, a constraint such that a magnitude of a given RSSI associated with other respective partitions of the diagram is less than or equal to a highest magnitude of a given RSSI associated with neighboring partitions of the other respective partitions.

In another example, a non-transitory computer readable medium having stored therein instructions, that when executed by a computing device, cause the computing device to perform functions is provided. The functions comprise receiving data related to received signal strength indication (RSSI) for a wireless access point for a plurality of locations of an area, and associating the data to a diagram of the area based on the plurality of locations of the area. The diagram is divided into a plurality of partitions. The functions further comprise determining a given partition of the plurality of partitions of the diagram in which a magnitude of a given RSSI associated with the given partition is greater than or equal to a highest magnitude of a given RSSI associated with any partitions of the plurality of partitions, assigning a location of the wireless access point to be within the given partition, and applying a constraint such that a magnitude of a given RSSI associated with other respective partitions of the diagram is less than or equal to a highest magnitude of a given RSSI associated with neighboring partitions of the other respective partitions.

In still another example, a system is provided that comprises one or more processors, and data storage configured to store instructions that, when executed by the one or more processors, cause the system to perform functions. The functions comprise receiving data related to received signal strength indication (RSSI) for a wireless access point for a plurality of locations of an area, and associating the data to a diagram of the area based on the plurality of locations of the area. The diagram is divided into a plurality of partitions. The functions further comprise determining a given partition of the plurality of partitions of the diagram in which a magnitude of a given RSSI associated with the given partition is greater than or equal to a highest magnitude of a given RSSI associated with any partitions of the plurality of partitions, assigning a location of the wireless access point to be within the given partition, and applying a constraint such that a magnitude of a given RSSI associated with other respective partitions of the diagram is less than or equal to a highest magnitude of a given RSSI associated with neighboring partitions of the other respective partitions.

In yet another example, a system is provided that comprises a means for receiving data related to received signal strength indication (RSSI) for a wireless access point for a plurality of locations of an area, and a means for associating the data to a diagram of the area based on the plurality of locations of the area. The diagram is divided into a plurality of partitions. The system further comprises a means for determining a given partition of the plurality of partitions of the diagram in which a magnitude of a given RSSI associated with the given partition is greater than or equal to a highest magnitude of a given RSSI associated with any partitions of the plurality of partitions, a means for assigning a location of the wireless access point to be within the given partition, and a means for applying a constraint such that a magnitude of a given RSSI associated with other respective partitions of the diagram is less than or equal to a highest magnitude of a given RSSI associated with neighboring partitions of the other respective partitions.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Figure 1:
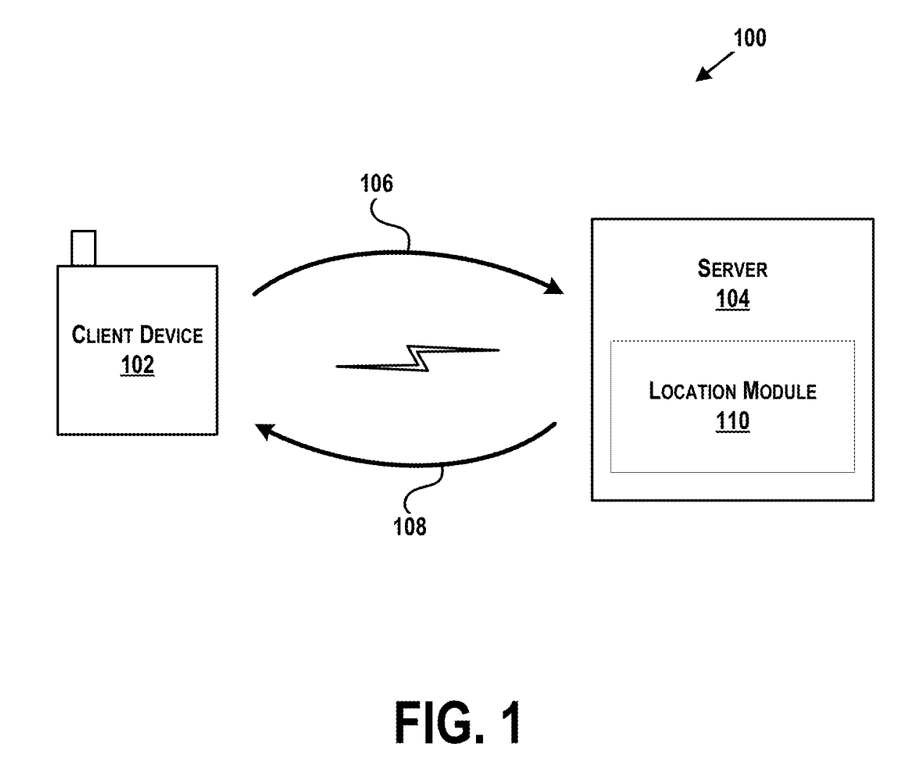
FIG. 1 illustrates an example communication system in which an example method may be implemented.

Referring now to the figures, FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, or tablet computing device, etc., that is configured to transmit data 106 to or receive data 108 from the server 104 in accordance with the method and functions described herein. The client device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Further, the server 104 may be configured to send data 108 to or receive data 106 from the client device 102. The server 104 may include a location module 110 which may be configured to process the data 106 received from the client device 102 to determine a locations (present and historical) associated with the client device 102.

The data 106 received by the server 104 from the client device 102 may take various forms. For example, the client device 102 may provide information indicative of a location of the client device 102, movement of the client device 102, or inputs from a user of the client device 102. The server 104 may then process the data 106 to identify a location history that matches to the received data.

The data 108 sent to the client device 102 from the server 104 may take various forms. For example, the server 104 may send to the client device 102 an indication of location, updated location history information, or information based on the locations of the device.

Figure 2:
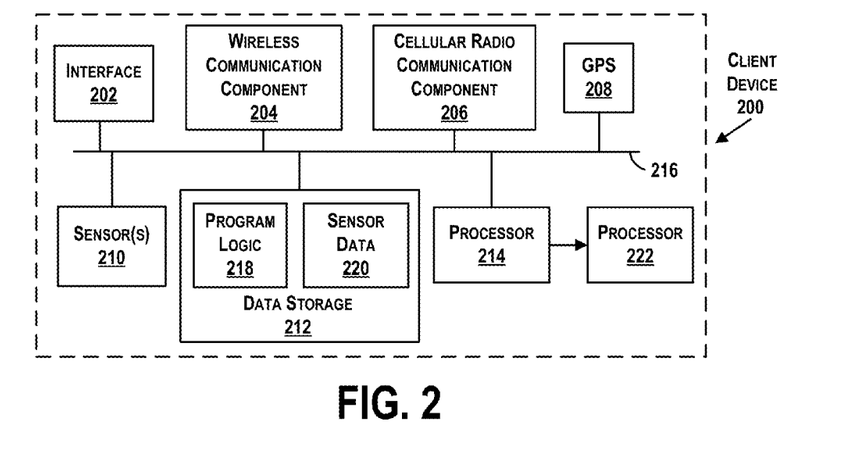
FIG. 2 illustrates a schematic drawing of an example device.

FIG. 2 illustrates a schematic drawing of an example device 200. In FIG. 2, the computing device takes a form of a client device 200. In some examples, some components illustrated in FIG. 2 may be distributed across multiple computing devices. However, for the sake of example, the components are shown and described as part of one example client device 200. The client device 200 may be or include a mobile device, desktop computer, email/messaging device, tablet computer, or similar device that may be configured to perform the functions described herein.

In some implementations, the client device 200 may include a device platform (not shown), which may be configured as a multi-layered Linux platform. The device platform may include different applications and an application framework, as well as various kernels, libraries, and runtime entities. In other examples, other formats or systems may operate the client device 200 as well.

The client device 200 may include an interface 202, a wireless communication component 204, a cellular radio communication component 206, a global position system (GPS) 208, sensor(s) 210, data storage 212, and a processor 214. Components illustrated in FIG. 2 may be linked together by a communication link 216. The client device 200 may also include hardware to enable communication within the client device 200 and between the client device 200 and another computing device (not shown), such as a server entity. The hardware may include transmitters, receivers, and antennas, for example.

The interface 202 may be configured to allow the client device 200 to communicate with another computing device (not shown), such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs as well.

The wireless communication component 204 may be a communication interface that is configured to facilitate wireless data communication for the client device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The processor 214 may be configured to determine one or more geographical location estimates of the client device 200 using one or more location-determination components, such as the wireless communication component 204, the cellular radio communication component 206, or the GPS 208. For instance, the processor 214 may use a location-determination algorithm to determine a location of the client device 200 based on a presence and/or location of one or more known wireless access points within a wireless range of the client device 200. In one example, the wireless communication component 204 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the client device 200 may be determined.

In another instance, the processor 214 may use a location-determination algorithm to determine a location of the client device 200 based on nearby cellular base stations. For example, the cellular radio communication component 206 may be configured to at least identify a cell from which the client device 200 is receiving, or last received, signal from a cellular network. The cellular radio communication component 206 may also be configured to measure a round trip time (RTT) to a base station providing the signal, and combine this information with the identified cell to determine a location estimate. In another example, the cellular communication component 206 may be configured to use observed time difference of arrival (OTDOA) from three or more base stations to estimate the location of the client device 200.

In still another instance, the processor 214 may use a location-determination algorithm to determine a location of the client device 200 based on signals sent by GPS satellites above the Earth. For example, the GPS 208 may be configured to estimate a location of the mobile device by precisely timing signals sent by the GPS satellites.

In some examples, the processor 214 may use a location-determination algorithm that combines location estimates determined by multiple location-determination components, such as a combination of the wireless communication component 204, the cellular radio component 206, and the GPS 208.

The sensor 210 may include one or more sensors, or may represent one or more sensors included within the client device 200. Example sensors include an accelerometer, gyroscope, pedometer, light sensors, microphone, camera, or other location and/or context-aware sensors.

The data storage 212 may store program logic 218 that can be accessed and executed by the processor 214. The data storage 210 may also store collected sensor data 220 that may include data collected by any of the wireless communication component 204, the cellular radio communication component 206, the GPS 208, and any of sensors 210.

The communication link 216 is illustrated as a wired connection; however, wireless connections may also be used. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The client device 200 is illustrated to include an additional processor 222. The processor 222 may be configured to control other aspects of the client device 200 including displays or outputs of the client device 200 (e.g., the processor 222 may be a GPU). Example methods described herein may be performed individually by components of the client device 200, or in combination by one or all of the components of the client device 200. In one instance, portions of the client device 200 may process data and provide an output internally in the client device 200 to the processor 222, for example. In other instances, portions of the client device 200 may process data and provide outputs externally to other computing devices.

Figure 3:
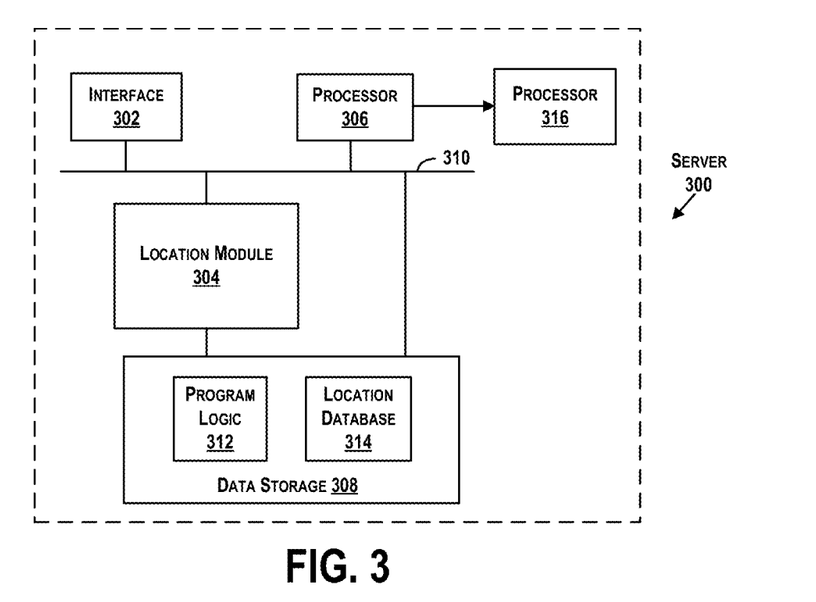
FIG. 3 illustrates a schematic drawing of another example computing device.

FIG. 3 illustrates a schematic drawing of another example computing device. In FIG. 3, the computing device takes a form of a server 300. In some examples, some components illustrated in FIG. 3 may be distributed across multiple servers. However, for the sake of example, the components are shown and described as part of one example server 300. The server 300 may be a computing device, cloud, or similar entity that may be configured to perform the functions described herein.

The server 300 may include a communication interface 302, a location module 304, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a client device and determine a geographic location of the client device. The determination may be based on outputs of an accelerometer, gyroscope, or other sensors of the client device, as well as based on location determinations of the client device. The location module 304 may further be configured to determine and store a history of sensor measurements of the client device for later reprocessing based on updated data pertaining to networks or information used to the determine the locations.

The data storage 308 may store program logic 312 that can be accessed and executed by the processor 306. The data storage 310 may also include a location database 314 that can be accessed by the processor 306 as well, for example, to retrieve information regarding wireless access points, locations of satellites in a GPS network, floor plans of a building, etc., or any other type of information useful for determining a location of a client device.

The server is illustrated with a second processor 316 which may be an application specific processor for input/output functionality. In other examples, functions of the processor 306 and the processor 316 may be combined into one component.

Within examples, measurements collected from various sensors of a device (such as WiFi components, GPS sensors, and inertial sensors) can be combined with information from external databases (such as known locations of WiFi access points or building floor plans) to estimate a location or movement of the device in real-time. Recording the real-time location estimate at all times (or intervals/increments of time) may also produce a location history.

Figure 4:
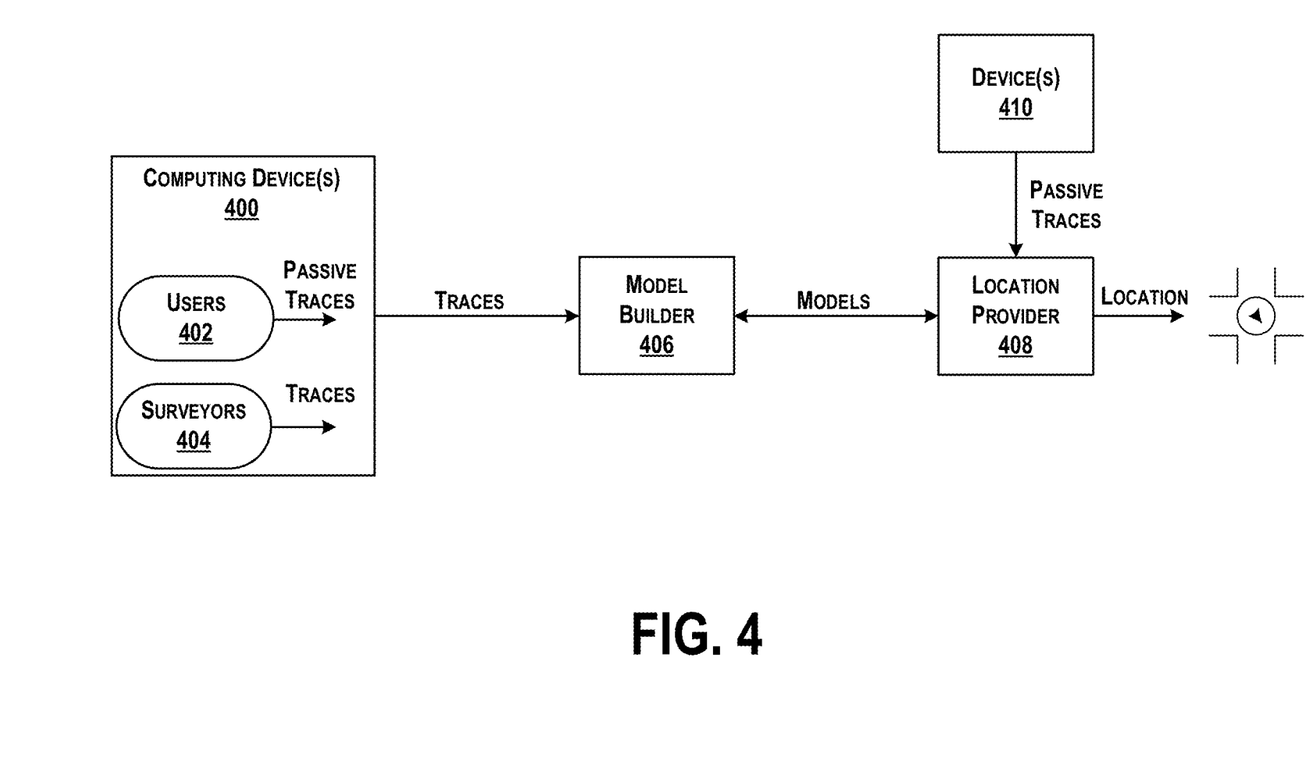
FIG. 4 is a flow diagram illustrating an example method for determining a location or movement of a device.

FIG. 4 is a flow diagram illustrating an example method for determining a location or movement of a device. Initially, computing device(s) 400, operated by users 402 or surveyors 404, may traverse areas in an environment and output traces to a model builder 406. A device operated by a user 402 may output traces passively (i.e., the device may be configured to output the trace data with no additional user input), including raw data output by sensors of the device like WiFi scans, GPS data, accelerometer data, etc. Each trace may be associated with a time the data was collected, and thus, for traces that include GPS data, other data in the traces also has location-specific references. A device operated by a surveyor 404 may have location-specific references for all traces, whether due to associated GPS data or manual input of location information.

The model builder 406 may be a module on a computing device or server, and may be configured to generate a model of the environment based on the received traces. The model builder 406 may include a trace localizer and a map builder. The model builder 406 may access reference data such as information like strength of signal (RSSI) for WiFi access points in the environment at specific locations in the environment, or other landmark data of the environment. The model builder 406 may be configured to generate a map or path of the device based on the traces. In one example, the model builder 406 may utilize GPS data to determine locations of the device over time, utilize dead reckoning (based on accelerometer and gyroscope outputs) to project a path, and optimize the path by jointly combining each. The model builder 406 may further optimize the path to match WiFi scan data to the reference WiFi maps to align a path that most likely resembles a path that the device traversed through the environment.

A location provider 408 may access a model output by the model builder 406 to determine locations of other device(s) 410 based on provided passive traces as well. Within examples, the location provider 408 may return a location of the device or an estimation of movement of the device to the device 410 based on data received in the traces.

Traces received from devices may include a variety of measurements from multiple different sensors, and may include a variety of measurements collected over time or at various locations. A trace may refer to a sensor log or a collection of data output from sensors on the device over some time period. The sensors that output data may be selected, or data to be included within the sensor log may also be selected. In some examples, a trace of data may include all data collected by a device (using a number of sensors) over a given time frame (e.g., about 5 seconds, or perhaps about 5 minutes long). Measurements in a trace or from trace to trace may be considered statistically independent. However, in instances in which the measurements are collected from positions/locations in close proximity or collected close in time, the measurements may have correlations. To reflect the fact that time or position can influence measurement noises, information from measurements that are close in time or in space can be discounted so as to down-weight information received from each measurement, such that when a same or similar data measurement is observed more than once that satisfies the time or position correlation, the measurements can be assigned weights to discount the information. By discounting correlated measurements, errors in such measurements may not be considered more heavily within estimations of location or movement of the device. Also, however, by discounting correlated measurements, all information including erroneous noise signals as well as correct data measurements, are discounted, and thus some information may be lost.

Data in the received traces may be used in a graphSLAM (simultaneous localization and mapping algorithm) or similar SLAM algorithm to determine a map associated with the received data. As one example, the received traces may include RSSI for various areas associated with a WiFi access point, and a wireless signal strength map for the WiFi access point can be generated. Data from many devices can be received, and since the data may vary per device, constraints can be defined or utilized to help assign RSSI values in various partitions of the map during generation of the map or to update RSSI values of a known or given map. Within examples, solving a graph-based SLAM problem involves constructing a graph whose nodes represent poses or landmarks and in which an edge between two nodes encodes a sensor measurement that constrains the connected poses. Constraints can be contradictory since observations or measurements are received from many devices. Once the graph is constructed, a configuration of the nodes that minimizes a cost function (or error introduced by the constraints) to be maximally consistent with the measurements can be determined.

Within examples, areas can be divided into a grid including cells, and a value of an RSSI can be assigned per cell to generate a WiFi signal strength map. An RSSI map for the wireless access point may result including assigned RSSI values per the plurality of partitions based on application of the constraint. Rather than generating a WiFi signal strength map of the area for the wireless access point based on the received data alone, so as to generate the map based on collected data alone including outliers and possible false measurements, constraints can be applied to the received data (as described in FIG. 5 below) so as to modify values of the received data associated with the plurality of partitions. The RSSI map for the wireless access point then includes indications of a diffusion of signal strength over the area away from the location of the wireless access point based on the modified values of the received data.

Figure 5:
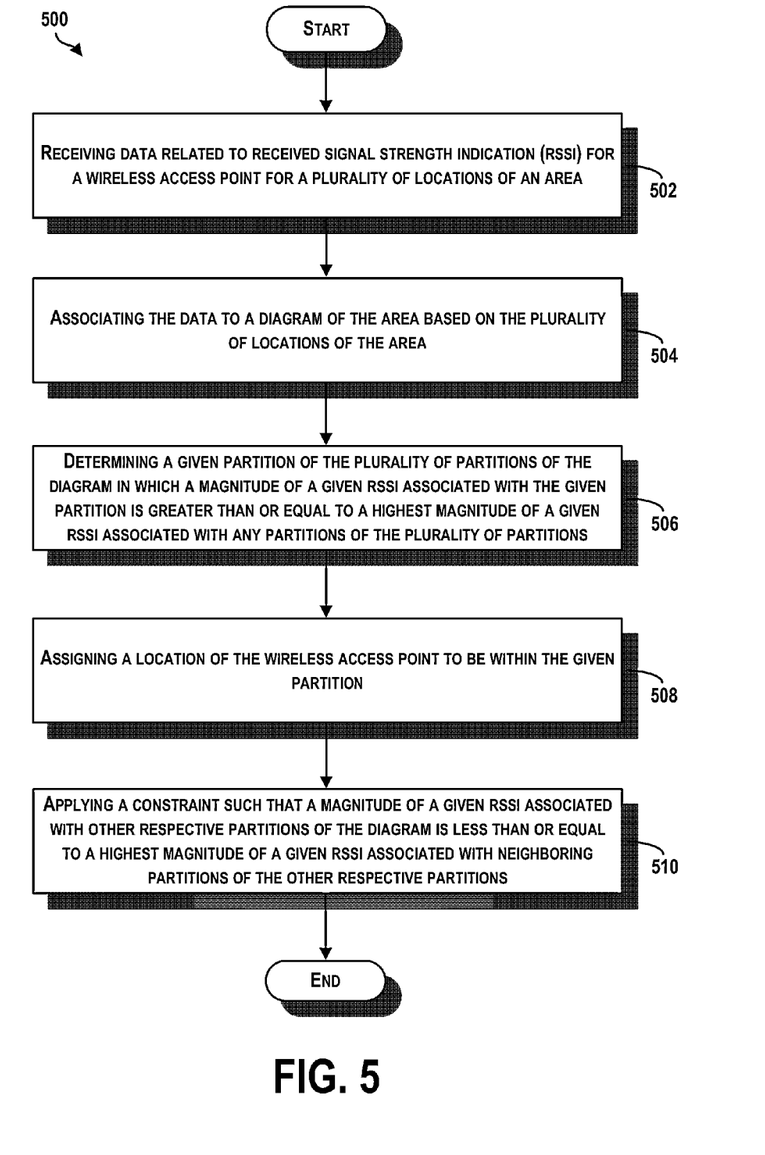
FIG. 5 is a block diagram of an example method of determining a wireless signal strength map, in accordance with at least some embodiments described herein.

FIG. 5 is a block diagram of an example method of determining a wireless signal strength map, in accordance with at least some embodiments described herein. Method 500 shown in FIG. 5 presents an embodiment of a method that, for example, could be used with the system 100 in FIG. 1, the device 200 in FIG. 2, the server 300 in FIG. 3, or the system in FIG. 4, for example, or may be performed by a combination of any components of FIGS. 1-4. Method 500 may include one or more operations, functions, or actions as illustrated by one or more of blocks 502-510. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 500 and other processes and methods disclosed herein, each block in FIG. 5 may represent circuitry that is wired to perform the specific logical functions in the process.

Functions of the method 500 may be fully performed by a computing device, or may be distributed across multiple computing devices and/or a server. In some examples, the computing device may receive information from sensors of the computing device, or where the computing device is a server the information can be received from another device that collects the information. The computing device could further communicate with a server to determine the matching media files, for example.

At block 502, the method 500 includes receiving data related to received signal strength indication (RSSI) for a wireless access point for a plurality of locations of an area. In some examples, the data may include scans of a WiFi access point collected from the area, and the data may further include a WiFi access point identifier. The data may be included within a trace of data received from a device, and other data may be provided as well. As examples, any data output by sensors such as an accelerometer, a gyroscope, a WiFi transceiver, a GPS module, a magnetometer, a barometer, and a Bluetooth transceiver, may be received.

The data may be used to estimate a position of the WiFi access point as well as signal strength of the WiFi access point at various areas near and around the WiFi access point to generate a fingerprint map specific for the WiFi access point. In other examples in which the data is representative of Bluetooth wireless signals or other wireless radio frequency signals, the data may be used to estimate signal strength of a source of the wireless signals.

A number of traces may be received from many devices, and may be arranged per WiFi access point identifier so as to associate all WiFi data per access point.

In addition, in examples, the threshold distance may be within about five meters, about 10 meters, or within a range of about 2-10 meters. For data that includes information indicative of a geographic position or location, such information may be used to determine whether the data was collected within the threshold distance of each other. As an example, in a group of data received, a GPS position as well as a WiFi scan may be received. The GPS position may correspond to where the WiFi scan was collected, and thus, can be used to determine if the WiFi scan is within a threshold distance of other WiFi scans that also have corresponding position coordinates so as to be considered associated with the same access point.

At block 504, the method 500 includes associating the data to a diagram of the area based on the plurality of locations of the area, wherein the diagram is divided into a plurality of partitions. The data may be associated so that the partitions correspond to portions of the areas. In some examples, the diagram of the area is a geographical map, and the data is associated based on where the data was collected.

At block 506, the method 500 includes determining a given partition of the plurality of partitions of the diagram in which a magnitude of a given RSSI associated with the given partition is greater than or equal to a highest magnitude of a given RSSI associated with any partitions of the plurality of partitions. In some examples, a comparison is performed over RSSI values of all partitions so as to determine a highest RSSI value for a single WiFi access point. This function may be performed for each WiFi access point to generate multiple WiFi signal strength maps.

At block 508, the method 500 includes assigning a location of the wireless access point to be within the given partition. Thus, for the partition that has the highest RSSI, that partition will be assigned to be or to include the wireless access point. In some examples, the location of the WiFi access point may be known or determined from other sources as well, and the partition assigned to include the access point can be verified with other known information (e.g., tables of WiFi access points).

At block 510, the method 500 includes applying a constraint such that a magnitude of a given RSSI associated with other respective partitions of the diagram is less than or equal to a highest magnitude of a given RSSI associated with neighboring partitions of the other respective partitions. In some examples, neighboring partitions of the other respective partitions are partitions adjacent to the other respective partitions or partitions surrounding respective partitions. The constraint may alternatively be applied such that the RSSI associated with other respective partitions of the diagram is less than the highest magnitude of the given RSSI associated with neighboring partitions of the other respective partitions.

The constraint may be applied in many ways. For example, the constraint may require the RSSI be lower than that of a given partition, and any amount lower may be sufficient. As a specific example, each partition may be assigned a moving value or estimation of an expected signal strength in the partition, and the constraint may be applied to these values requiring the values to be increased or decreased based on relative comparisons to values of neighboring partitions. The constraint may be applied to the RSSI values using a non-linear least squares solver, after formulating each constraint, as a contributor to a cost function that is being minimized, for example. The constraint may thus indicate to increase or decrease the RSSI values.

By applying a constraint, the method 500 may further include determining an RSSI map for the wireless access point in which the RSSI map includes a single local maximum RSSI value indicative of the location of the wireless access point, and indications of a diffusion of signal strength over the area away from the location of the wireless access point. Thus, the RSSI degrades as the distance away from the WiFi access point increases. The constraints may be utilized or applied in the graphSLAM or similar SLAM algorithms.

In further examples, for partitions of the plurality of partitions that are a threshold distance away from the given partition including the location of the wireless access point, a given constraint can be applied such that a magnitude of a given RSSI associated with the partitions that are the threshold distance away is about zero.

Figure 6:
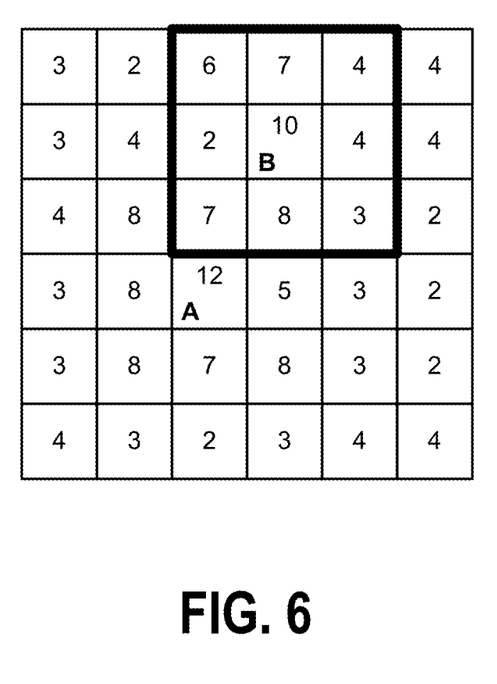
FIG. 6 is an example diagram of an area for a wireless signal strength map.

FIG. 6 is an example diagram of an area for a wireless signal strength map. In FIG. 6, the diagram is divided into a grid of cells, and each cell has an associated RSSI value. The RSSI values are conceptual only, and are represented by numerals for illustrative purposes. Each cells may be representative of a geographic partition of the area. In FIG. 6, a center cell labeled "A" is found to have a highest RSSI value, and thus, according to the method 500 of FIG. 5, cell A is assigned to be the location of the WiFi access point. Next, a constraint is applied to the diagram such that a magnitude of a given RSSI associated with other respective partitions of the diagram is less than or equal to a highest magnitude of a given RSSI associated with neighboring partitions of the other respective partitions. Taking cell B as an example, cell B has a value of ten, however, a highest value of any neighboring eight cells (shown by the bolded square) is eight. Thus, cell B will have a constraint applied to lower its value to be less than or equal to eight. In this way, the RSSI map for the wireless access point will degrade as the distance from the WiFi access point increases even though a collected or observed value of the RSSI at cell B may be higher than that of its neighbors (e.g., possibly due to interference or environmental conditions or structures).

The method 500 may be performed iteratively, such that after applying a constraint to cell B, remaining cells may be processed and possibly readjusted as well based on the modification to the value of cell B, for example.

Figure 7A:
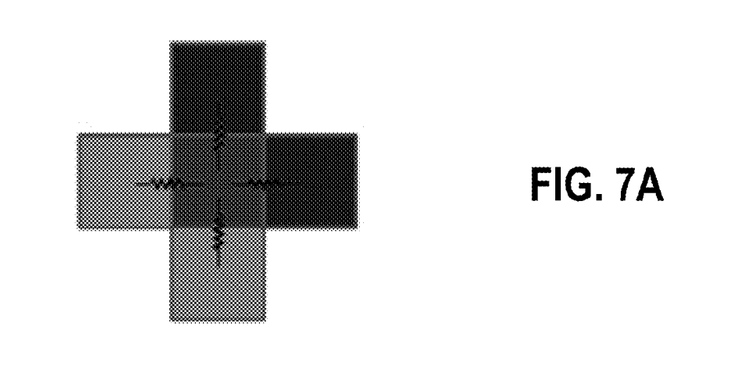
FIG. 7A is an example conceptual cell diagram illustrating correspondence between values of RSSI per cells.

FIG. 7A is an example conceptual cell diagram illustrating correspondence between values of RSSI per cells. In some examples, a cell (such as the center cell) may have an RSSI value adjusted based on neighboring cells which may include a left cell, a right cell, a top cell, and a bottom cell. In this example, the value of the RSSI assigned to the center cell is constrained based on values of four neighboring cells.

Figure 7B:
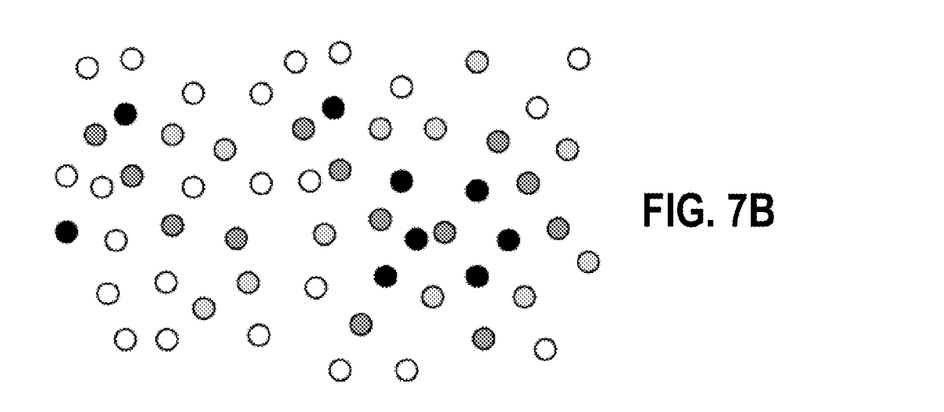
FIG. 7B is a conceptual illustration of received measurements within an area.

FIG. 7B is a conceptual illustration of received measurements within an area. Darker measurements indicate stronger measurements. These are readings used to create a map.

Figure 7C:
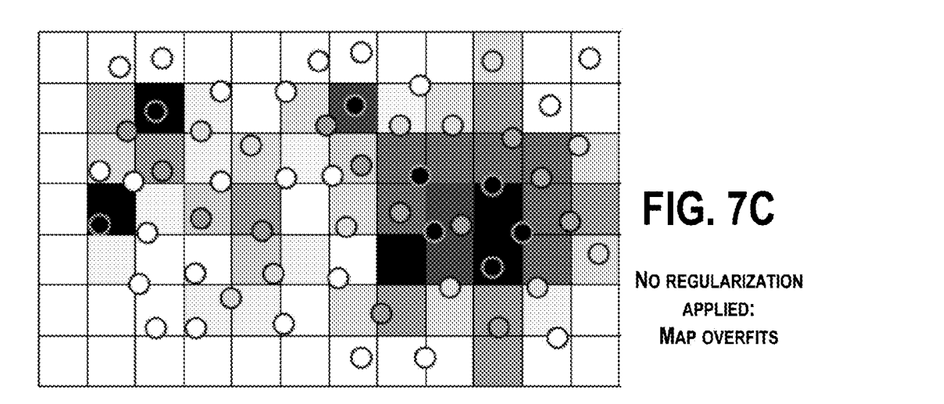
FIGS. 7C-7F are other example diagrams of an area for a wireless signal strength map.

FIG. 7C is another example diagram of an area for a wireless signal strength map. In FIG. 7C, a map is generated based on the received data shown in FIG. 7B as collected from the area. Darker shades are representative of higher RSSI values collected. As shown on the map, no regularization is applied, and the values in the partitions overfit the data. for example, there are multiple areas in the map that indicate strong signal strength, when it is expected that there would only be one peak signal strength at the location of the wireless AP.

Figure 7D:
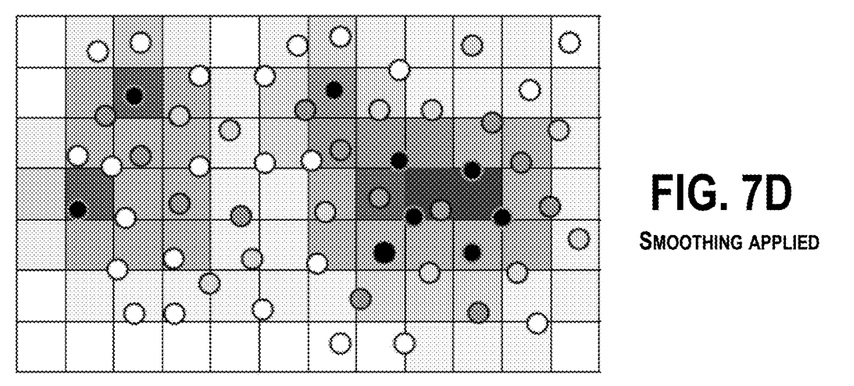

FIG. 7D is another example diagram of the area for the wireless signal strength map. In FIG. 7D, smoothing is applied, and the indication of signal strengths is smoother as expected for a diffusion based signal model. However, there are still multiple maximum or peak signal strength areas.

Figure 7E:
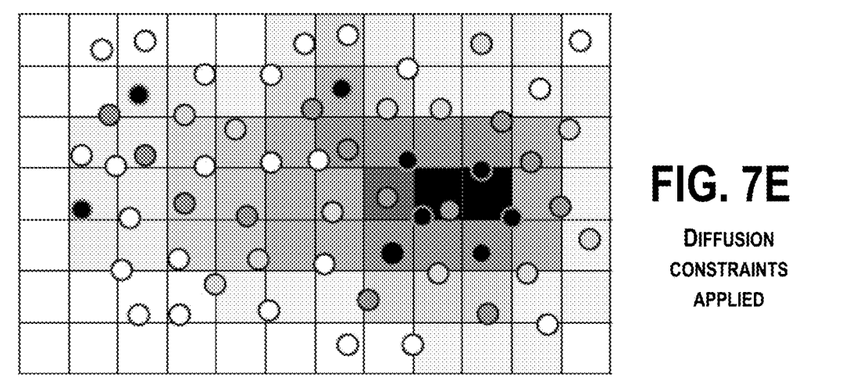

FIG. 7E is another example diagram of the area for the wireless signal strength map. In FIG. 7E, regularization is added such that values of neighboring cells are constrained to be similar, and a single maximum partition or area (in which two neighboring partitions are maximum) remains. The map in FIG. 7E may capture the fact RSSI field is somewhat smooth and that two neighboring cells should have similar RSSI values. Applying four conceptual constraints (or springs) per cell, as shown in FIG. 7A, results in the map having one general area with high RSSI values shown shaded dark, and values degrade as the distance from the WiFi access point increases. Such a map can be generated using smoothing constraints to require that a cell's RSSI is lower than (or equal to) a highest RSSI of its neighbors to simulate diffusion of the signal.

Figure 7F:
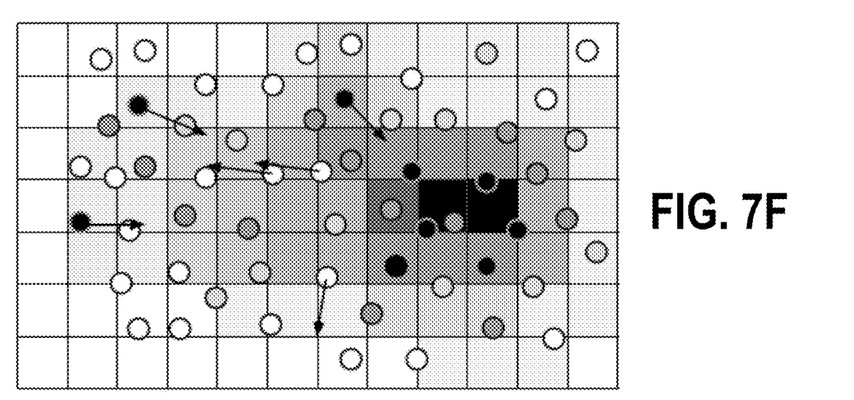

FIG. 7F is yet another example diagram of an area for a wireless signal strength map. In FIG. 7F, generally, measurements that do not agree with the regularized map are pushed towards areas where the measurements do agree. The regularization prevents the measurements from only agreeing with the map where they are positioned. FIG. 7E illustrates how the map is modified during regularization. After applying the method 500 in FIG. 5 and adding the diffusion constraint, the map is caused to have a single maximum and localization of the traces is improved resulting in a modified map. The iterative process applies constraints and other outer areas surrounding the hotspot (i.e., the WiFi access point location) may have values lowered to be within the constraint.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving data related to received signal strength indication (RSSI) for a wireless access point for a plurality of locations of an area;
associating the data to a diagram of the area based on the plurality of locations of the area, wherein the diagram is divided into a plurality of partitions;
determining, by a processor, a first partition of the plurality of partitions of the diagram in which a magnitude of an RSSI associated with the first partition is greater than or equal to a highest magnitude of an RSSI associated with any other partitions of the plurality of partitions;
assigning a location of the wireless access point to be within the first partition; and
assigning RSSI magnitudes to the diagram to generate an RSSI map of signal strength for the wireless access point over the plurality of locations of the area by applying, by the processor, a constraint such that a magnitude of an RSSI associated with partitions of the diagram other than the first partition is less than or equal to the magnitude of the RSSI associated with the first partition and such that the magnitude of the RSSI associated with partitions of the diagram other than the first partition is also less than or equal to a highest magnitude of an RSSI associated with neighboring partitions that are adjacent to the partitions.

2. The method of claim 1, wherein receiving the data related to received signal strength indication (RSSI) for the wireless access point comprises receiving scans of a WiFi access point collected from the area, wherein the data further includes a WiFi access point identifier.

3. The method of claim 1, wherein the diagram of the area is a geographical map.

4. The method of claim 1, further comprising determining the RSSI map for the wireless access point in which the RSSI map includes a single local maximum RSSI value indicative of the location of the wireless access point.

5. The method of claim 1, further comprising determining the RSSI map for the wireless access point including indications of a diffusion of signal strength over the area away from the location of the wireless access point.

6. The method of claim 1, further comprising, for partitions of the plurality of partitions that are a threshold distance away from the first partition including the location of the wireless access point, applying a given constraint such that a magnitude of a given RSSI associated with the partitions that are the threshold distance away is about zero.

7. The method of claim 1, further comprising dividing the area into a grid including cells, and wherein the plurality of partitions include the cells, and the method further comprises:
assigning a value of an RSSI per cell.

8. The method of claim 1, further comprising determining the RSSI map for the wireless access point including assigned RSSI values per the plurality of partitions based on application of the constraint.

9. The method of claim 1, further comprising applying the constraint such that the magnitude of the RSSI associated with partitions of the diagram other than the first partition is less than the highest magnitude of the RSSI associated with neighboring partitions that are adjacent to the partitions.

10. The method of claim 1, wherein associating the data to the diagram of the area based on the plurality of locations of the area comprises generating the RSSI map of signal strength of the area for the wireless access point based on the received data being associated to the plurality of partitions corresponding to the plurality of locations of the area, and the method further comprising:
applying the constraint to the data of the diagram so as to modify values of the received data associated with the plurality of partitions; and providing the RSSI map for the wireless access point including indications of a diffusion of signal strength over the area away from the location of the wireless access point based on the modified values of the received data.

11. A non-transitory computer readable memory having stored therein instructions, that when executed by a computing device, cause the computing device to perform functions comprising:
receiving data related to received signal strength indication (RSSI) for a wireless access point for a plurality of locations of an area;
associating the data to a diagram of the area based on the plurality of locations of the area, wherein the diagram is divided into a plurality of partitions;
determining a first partition of the plurality of partitions of the diagram in which a magnitude of an RSSI associated with the first partition is greater than or equal to a highest magnitude of an RSSI associated with any other partitions of the plurality of partitions;
assigning a location of the wireless access point to be within the first partition; and
assigning RSSI magnitudes to the diagram to generate an RSSI map of signal strength for the wireless access point over the plurality of locations of the area by applying a constraint such that a magnitude of an RSSI associated with partitions of the diagram other than the first partition is less than or equal to the magnitude of the RSSI associated with the first partition and such that the magnitude of the RSSI associated with partitions of the diagram other than the first partition is also less than or equal to a highest magnitude of an RSSI associated with neighboring partitions that are adjacent to the partitions.

12. The non-transitory computer readable memory of claim 11, wherein receiving the data related to received signal strength indication (RSSI) for the wireless access point comprises receiving scans of a WiFi access point collected from the area, wherein the data further includes a WiFi access point identifier.

13. The non-transitory computer readable memory of claim 11, wherein the functions further comprise determining the RSSI map for the wireless access point in which the RSSI map includes a single local maximum RSSI value indicative of the location of the wireless access point.

14. The non-transitory computer readable memory of claim 11, wherein the functions further comprise determining the RSSI map for the wireless access point including indications of a diffusion of signal strength over the area away from the location of the wireless access point.

15. The non-transitory computer readable memory of claim 11, wherein the functions further comprise, for partitions of the plurality of partitions that are a threshold distance away from the first partition including the location of the wireless access point, applying a given constraint such that a magnitude of a given RSSI associated with the partitions that are the threshold distance away is about zero.

16. A system comprising:
one or more processors;
data storage configured to store instructions that, when executed by the one or more processors, cause the system to perform functions comprising:
receiving data related to received signal strength indication (RSSI) for a wireless access point for a plurality of locations of an area;
associating the data to a diagram of the area based on the plurality of locations of the area, wherein the diagram is divided into a plurality of partitions;
determining a first partition of the plurality of partitions of the diagram in which a magnitude of an RSSI associated with the first partition is greater than or equal to a highest magnitude of an RSSI associated with any other partitions of the plurality of partitions;
assigning a location of the wireless access point to be within the given partition; and
assigning RSSI magnitudes to the diagram to generate an RSSI map of signal strength for the wireless access point over the plurality of locations of the area by applying a constraint such that a magnitude of an RSSI associated with partitions of the diagram other than the first partition is less than or equal to the magnitude of the RSSI associated with the first partition and such that the magnitude of the RSSI associated with partitions of the diagram other than the first partition is also less than or equal to a highest magnitude of an RSSI associated with neighboring partitions that are adjacent to the partitions.

17. The system of claim 16, wherein the functions further comprise dividing the area into a grid including cells, and wherein the plurality of partitions include the cells, and the method further comprises:
assigning a value of an RSSI per cell.

18. The system of claim 16, wherein the functions further comprise determining the RSSI map for the wireless access point including assigned RSSI values per the plurality of partitions based on application of the constraint.

19. The system of claim 16, wherein associating the data to the diagram of the area based on the plurality of locations of the area comprises generating the RSSI map of signal strength of the area for the wireless access point based on the received data being associated to the plurality of partitions corresponding to the plurality of locations of the area, and the functions further comprise:
applying the constraint to the data of the diagram so as to modify values of the received data associated with the plurality of partitions; and
providing the RSSI map for the wireless access point including indications of a diffusion of signal strength over the area away from the location of the wireless access point based on the modified values of the received data.

* * * * *